United States Patent [19]

Helffrich

[11] Patent Number: 4,479,050

[45] Date of Patent: Oct. 23, 1984

[54] SENSOR ALIGNMENT CIRCUIT AND METHOD OF OPERATION

[75] Inventor: David J. Helffrich, Nazareth, Pa.

[73] Assignee: Bell and Howell Company, Phillipsburg, N.J.

[21] Appl. No.: 334,761

[22] Filed: Dec. 28, 1981

[51] Int. Cl.³ .............................................. G06K 7/016
[52] U.S. Cl. ..................................... 235/474; 235/466
[58] Field of Search ................... 235/474, 466; 360/73

[56] References Cited

U.S. PATENT DOCUMENTS

| | | | |
|---|---|---|---|
| 3,369,109 | 2/1968 | Gregory | 235/474 |
| 3,506,807 | 4/1970 | Malaby | 235/61.11 |
| 3,586,833 | 6/1971 | Schafer | 235/474 |
| 3,588,457 | 6/1971 | Bijieveld | 235/474 |
| 3,701,097 | 10/1972 | Wolff | 340/146.3 Z |
| 3,731,064 | 5/1973 | Berler | 235/466 |
| 3,787,615 | 1/1974 | Foerster | 360/73 |
| 3,805,286 | 4/1974 | Kavanagh | 360/73 |
| 3,831,009 | 8/1974 | McMillin | 235/474 |
| 3,858,052 | 12/1974 | Luska | 250/548 |
| 3,859,510 | 1/1975 | Fiehmann | 235/474 |
| 4,034,341 | 7/1977 | Isono et al. | 340/146.3 |
| 4,058,708 | 11/1977 | Sherer et al. | 235/92 CC |
| 4,074,852 | 2/1978 | Wescott et al. | 235/463 |
| 4,104,514 | 8/1978 | Sherer et al. | 235/466 |
| 4,136,503 | 1/1979 | Miller | 53/507 |

Primary Examiner—Harold I. Pitts
Attorney, Agent, or Firm—Griffin, Branigan & Butler

[57] ABSTRACT

An electrical circuit provides an indication of the relative positioning of a sensor with respect to sensed indicia borne by documents traveling proximate the sensor. The circuit includes a first clock (10), a sensor switching circuit (30) which determines when the indicia is sensed, and means for determining whether the indicia is read at an acceptable time between successive first clock (10) pulses in order for the sensor to be properly positioned with respect to a document.

18 Claims, 4 Drawing Figures

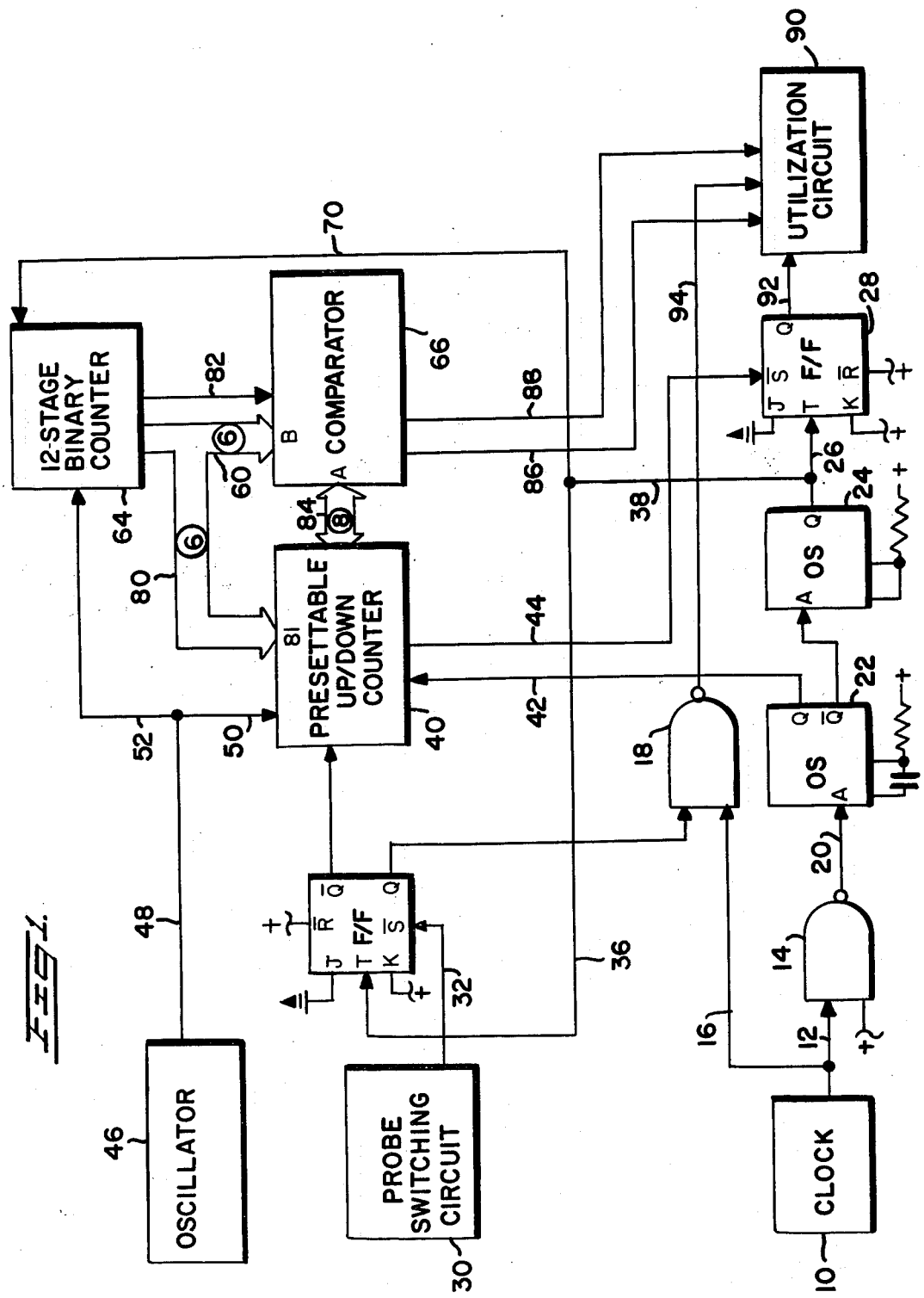

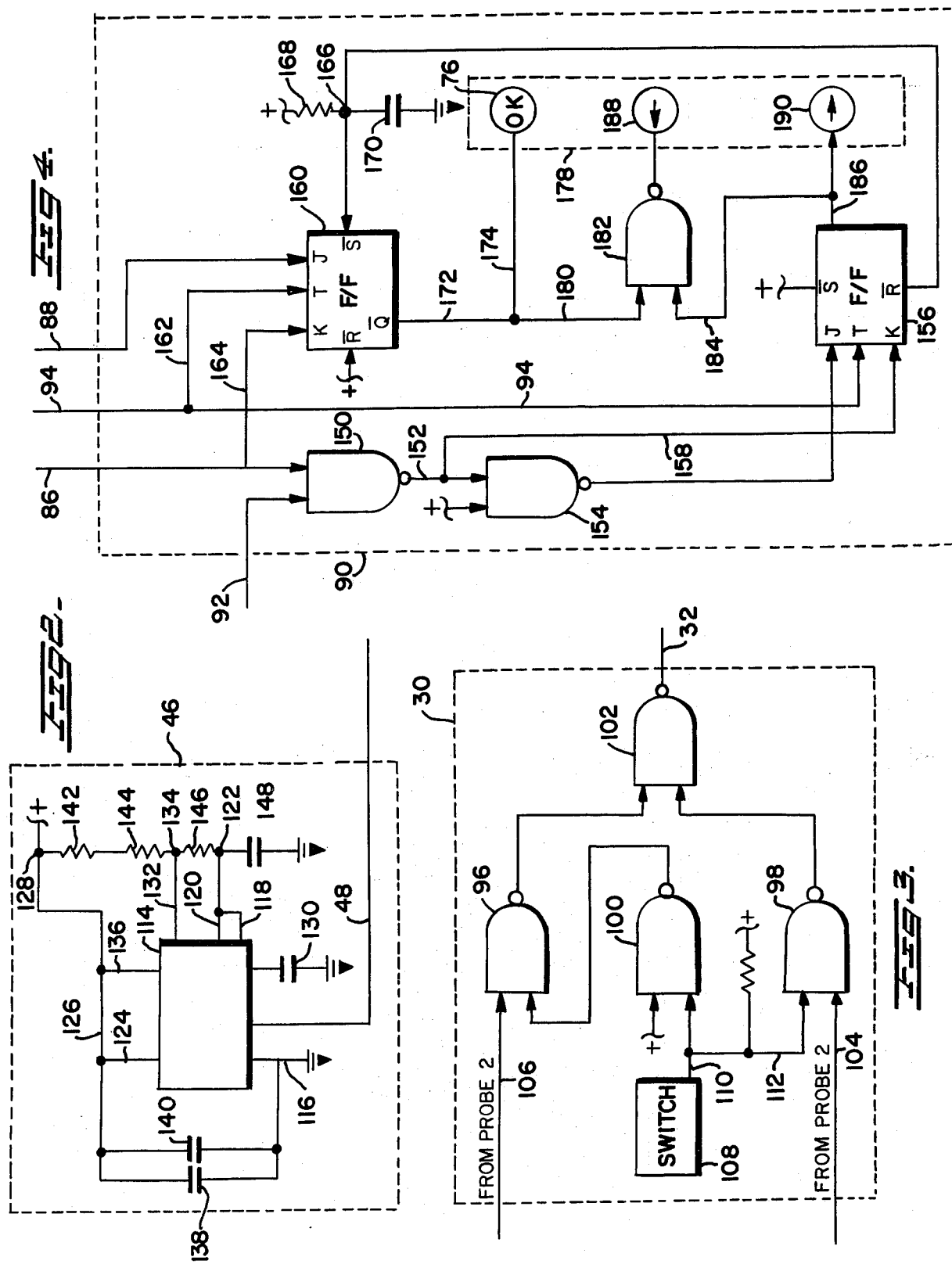

SENSOR ALIGNMENT CIRCUIT AND METHOD OF OPERATION

BACKGROUND OF THE INVENTION

This invention pertains to sensor alignment circuits and methods of operating apparatus having the same, and particularly to sensor alignment circuits wherein an indication is required of the relative positioning of sensing means with respect to sensed indicia borne by articles traveling proximate the sensing means.

Many indicia reading systems, such as bar code reading systems used in the postal environment, for example, require precision positioning of a reading or sensing means. Typically the sensing means is situated proximate a traveling web of documents or a conveyor transporting documents. The documents generally bear a printed indicia which must pass near or under the sensing means. For computer-generated documents, however, the print position of the indicia tend to drift so that after extensive printing the sensing means may no longer be precisely aligned with respect to the indicia.

When misalignment of sensing means and indicia occurs, the position of the sensing means must be readjusted. The precise repositioning of the sensing means is often a tricky maneuver requiring the use of an oscilloscope by a trained technician. As a result, repositioning of sensing means has heretofore involved expensive and time consuming service calls.

Hence, an object of this invention is the provision of a sensor alignment circuit which enables a machine operator to quickly and simply reposition the sensing means with respect to sensed indicia borne by documents traveling proximate the sensing means.

An advantage of this invention is the provision of sensor alignment circuit which provides an indication of sensing means positioning relative to a sensed indicia regardless of any change in the speed of travel of indicia-bearing documents traveling proximate the sensing means.

SUMMARY OF THE INVENTION

A sensor alignment circuit provides an indication of the relative positioning of sensing means with respect to sensed indicia borne by documents traveling proximate the sensing means. A first clock generates pulses at a frequency $f_1$ and having a period $t_1$ while a second clock generates pulses at a frequency $f_2$ (where $f_2$ is greater than $f_1$). Each first clock pulse enables a presettable up/down counter which counts second clock pulses until the up/down counter receives an indicia-triggered pulse occasioned by the sensing of the indicia. The indicia-triggered pulse causes a change of counting direction in the up/down counter so that subsequent second clock pulses received during the period $t_2$ cause the up/down counter to count down.

The second clock pulses are also applied to a binary counter which tallys an N-bit digital value corresponding to the cumulative number of second clock pulses generated during a current period $t_2$. At the beginning of current period $t_1$, however, the up/down counter was preset to a digital value represented by the N-1 upper order bits of the N bit digital value previously stored in the binary counter. During the current period $t_1$ the entire N-bit digital value is applied to a second bank of input terminals of a comparator, while a first bank of input terminals are connected to the data output terminals of the up/down counter.

A utilization circuit is enabled to receive any change in output signals from the comparator at the end of each period $t_1$ in which an indicia was read. In this respect, since the up/down counter is a wraparound device, the comparator's output signals indicate that the sensing means is properly positioned within an acceptable range whenever a signal at the comparator's first bank of input terminals is less than a signal at its second bank of input terminals. The utilization means includes a display for informing an operator either that the sensing means is properly positioned or in which direction the sensing means should be moved should the sensing means not be properly positioned.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating principles of the invention.

FIG. 1 is a schematic diagram of an alignment circuit according to one embodiment of the invention;

FIG. 2 is a schematic diagram of second clock means included in the alignment circuit of FIG. 1;

FIG. 3 is a schematic diagram of a switching circuit included in the alignment circuit of FIG. 1; and, FIG. 4 is a schematic diagram of a utilization circuit included in the alignment circuit of FIG. 1.

DETAILED DESCRIPTION OF THE DRAWINGS

The sensor alignment circuit of FIG. 1. comprises a first clock 10 which generates pulses at a frequency $f_1$ and a period $t_1$. In one embodiment, clock 10 is of a type which can be selectively preset so that the pulses generated thereby have one of several possible frequency settings at which the clock is capable of generating pulses. In another embodiment, clock 10 is of a type which functions as a position encoder and generates a pulse every time a document traveling on a conveying means is displaced a given distance, such as an eighth or a sixth of an inch, along the conveying path. Thus the frequency $f_1$ of clock 10 according to this second embodiment is variable and is dependent upon the speed of travel of the documents. Means for determining the displacement of the documents relative to a reference point may take several forms and an understanding thereof is not necessary for understanding the operation of the circuit described hereinafter.

The output terminal of the clock 10 is connected by a lead 12 to a first input terminal of a NAND gate 14 and by leads 12 and 16 to a first input terminal of a NAND 18. A second input terminal of the NAND 14 is connected to a positive potential. The output terminal of the NAND 14 is connected by a lead 20 to an A input terminal of one-shot multivibrator 22. The $\overline{Q}$ output terminal of the one-shot 22 is connected to the an A input terminal of a second one-shot multivibrator 24. The Q output terminal of the one-shot 24 is connected by a lead 26 to the T input terminal of a JK flip-flop 28. The J terminal of the flip-flop 28 is grounded; the K terminal is connected to a positive potential; and the low-activated reset terminal $\overline{R}$ of flip-flop 28 is connected to a positive potential.

The sensor alignment circuit of FIG. 1 also comprises a probe switching circuit, the details of which are discussed hereinafter with reference to FIG. 3. An output lead 32 of the probe switching circuit is connected to a low-actuated set terminal $\overline{S}$ of a JK flip-flop 34. The J input terminal of the flip-flop 34 is grounded; the T terminal is connected via leads 36, 38, and 26 to the Q output terminal of the one-shot 24; and the K input terminal is connected to a positive potential. The Q output terminal of the flip-flop 34 is connected to a second input terminal of the aforementioned NAND 18. The $\overline{Q}$ output terminal of the flip-flop is connected to a direction-changing input pin of a presettable up/down counter 40.

Although shown as one device in FIG. 1, the presettable up/down counter 40 comprises one or more wrap-around, presettable up/down counting semiconductor elements, such as two CD4516B devices connected together. As mentioned above, the change of direction input pin of the counter 40 is connected to the $\overline{Q}$ output terminal of the flip-flop 34. A preset enable pin of the counter 40 is connected by a lead 42 to the Q output terminal of the one-shot 22. A "carry" output pin of the counter 40 is connected by a lead 44 to the low-activated set terminal $\overline{S}$ of the flip-flop 28. Other pertinent pin connections for the counter 40 are discussed hereinafter with reference to other elements included in the sensor alignment circuit of FIG. 1.

The sensor alignment circuit of FIG. 1 further includes a second clock, also referred to as oscillator 46. The details of the oscillator 46 are discussed hereinafter with reference to FIG. 2. An output lead 48 from the oscillator 46 connects via a lead 50 to a clock-receiving input pin of the counter 40.

The sensor alignment circuit of FIG. 1 also includes a twelve-stage binary counter 64 and a comparator 66. In one embodiment, the counter 64 is a CD4040B semiconductor device and the comparator 66 comprises two CD4063B four-bit magnitude comparators cascaded into an eight-bit comparator.

With reference to the twelve-stage binary counter 64, a clock-receiving input pin is connected by leads 52 and 48 to the output terminal of the oscillator 46. A reset terminal of the counter 64 is connected by leads 70 and 38 to the Q output terminal of one-shot 24.

The twelve-stage binary counter 64 can have N number of buffered output pins where N is less than or equal to 12 for the CD4040B device shown. For the embodiment shown in FIG. 1, N is 7 so that the counter 64 can count to a digital value which can be represented by 7 bits. The buffered output pins of the binary counter 64 which correspond to the N-1 upper order bits of the N bit digital value contained in the binary counter 64 are connected by an N-1 lead bus 80 both to N-1 preset input terminals 81 of the presettable up/down counter 40 and to a bank of "word B" input terminals of the comparator 66. The buffered output pin of the binary counter 64 which corresponds to the lowest order bit in the digital value contained in the counter 64 is connected by a lead 82 to one of the "word B" input terminals of the comparator 66. "Word A" input terminals of the comparator 66 are connected by an eight lead bus 84 to the eight data output terminals of the presettable up/down counter 40.

Two output terminals of the comparator 66 are connected by leads 86 and 88 to second and fourth input terminals, respectively, of a utilization circuit 90. In this respect, lead 86 carries a high signal when "word A" is greater than "word B"; lead 88 carries a high signal when "word A" is less than "word B".

In addition to having its second and fourth input terminals connected to leads 86 and 88, respectively, the utilization circuit 90 has a first input terminal connected by a lead 92 to the Q output terminal of the JK flip-flop 28 and a third input terminal connected by a lead 94 to the output terminal of the NAND gate 18. Further details of the utilization circuit 90 are discussed hereinafter with respect to FIG. 4.

The probe switching circuit 30, detailed in FIG. 3, comprises four NAND gates 96, 98, 100 and 102. A first input terminal of the NAND gate 98 is connected by a lead 104 to a first sensor or probe (not shown). Likewise, a first input terminal of the NAND gate 96 is connected by a lead 106 to a second probe or sensor (not shown). The switching circuit 30 also comprises a switch 108 which indicates whether the output from probe 2 on line 106 or the output of probe 1 on line 104 is to be monitored. The switch 108 has an output terminal connected to a lead 110. According to the embodiment of the switch 108 shown in FIG. 3, lead 110 has a high signal thereon if the switch is activated to indicate that probe 1 is to be monitored and a low signal thereon if probe 2 is to be monitored. The signal on lead 10 is applied both to a first input terminal of the NAND gate 100 and via a lead 112 to the second input terminal of the NAND 98. A second input terminal of the NAND 100 is connected to a positive potential while an output terminal of the NAND 100 is connected to a second input terminal of the NAND 96. The NAND 102 of the switching circuit of FIG. 3 has a first input terminal connected to the output terminal of the NAND 98 and a second input terminal connected to the output terminal of the NAND 96. The output terminal of the NAND 102 is connected by the lead 32 to the flip-flop 34 as discussed hereinbefore.

The details of one embodiment of oscillator 46 are seen in FIG. 2 wherein oscillator 46 comprises a free-running a HiNil 355 device 114. Pin 1 of the device 114 is connected by lead 116 to ground; pins 2 and 6 are connected by leads 118 and 120, respectively, to a point 122; pin 3 is connected to the aforediscussed lead 48; pin 4 is connected via leads 124 and 126 to a positive potential at point 128; pin 5 is connected through a 0.01 microfarad capacitor 130 to ground; pin 7 is connected by a lead 132 to a point 134; and, pin 8 is connected by leads 136 and 126 to the positive potential at point 128. A one microfarad capacitor 138 and a 0.1 microfarad capacitor 140 are connected in parallel with one another and with pins 4 and 1 of the device 114. A voltage division network from point 128 to ground includes a 10K variable resistor 142 and a 2.2K resistor 144 connected in series between points 128 and 134; a 22K resistor 146 connected between points 134 and 122; and, a 0.005 microfarad capacitor 148 connected between point 122 and ground.

With respect to the utilization circuit 90, the details of which are seen in FIG. 4, a NAND gate 150 has a first input terminal connected to the lead 92 and a second input terminal connected to the lead 86. The output terminal of the NAND 150 is connected by a lead 152 to a first input terminal of a second NAND gate 154. The second input terminal of the NAND gate 154 is connected to a positive potential while the output terminal of the NAND 154 is connected to a J input terminal of JK flip-flop 156. The K input terminal of the flip-flop 156 is connected by leads 152 and 158 to the output terminal of the NAND 150. The T input terminal of the flip-flop 156 is connected to the NAND 18 by the lead 94.

Utilization circuit 90 further comprises a second JK flip-flop 160 whose J terminal is connected to the comparator 66 by lead 88. The T terminal of the flip-flop 160 is connected by leads 162 and 94 to the NAND 18 while the K input terminal of the flip-flop 160 is connected by leads 164 and 86 to the comparator 66. The low-activated reset terminal $\overline{R}$ of the flip-flop 160 is connected to a positive potential while the low-activated set terminal $\overline{S}$ is connected to a point 166 on a divider network (the divider network comprising a 10K resistor 168 between point 166 and a positive voltage and a 10 microfarad capacitor 170 between point 166 and ground).

The $\overline{Q}$ output terminal of the flip-flop 160 is connected by leads 172 and 174 to a first indicating means 176 on an indicating console 178 (indicated by dashed lines). The $\overline{Q}$ output terminal of the flip-flop 160 is also connected by leads 172 and 180 to a first input terminal of a NAND gate 182. The second input terminal of the NAND 182 is connected by leads 184 and 186 to the $\overline{Q}$ output terminal of the flip-flop 156. The output terminal of the NAND 182 is connected to a second indicating means 188. The $\overline{Q}$ output terminal of the flip-flop 156 is also connected by lead 186 to a third indicating means 190. The low-activated set terminal $\overline{S}$ of the flip-flop 156 is connected to a positive potential while the low-activated reset terminal $\overline{R}$ is connected to the aforementioned point 166.

It should be understood that the indicating means 176, 188, and 190 on the console 178 of the utilization circuit 92 can be any suitable type, but are preferably visible indicating means such as LED or the like.

With reference to the one-shot multivibrators 22 and 24 of the FIG. 1 circuit, the values of the resistors associated therewith are 4.7K and the values of the capacitors are 0.005 microfarads.

The CD4516B, CD4040B, and CD4063B part numbers referenced above are manufactured by RCA and are described in *RCA Solid State COS/MOS Integrated Circuits* 1980. The HiNil 355 device referenced above, as well as all NAND gates referenced herein (HiNil 321) chips are manufactured by Teledyne and described in Teledyne's publication *Bipolar Interface Logic*, 1981.

It should be understood that the probe alignment circuit of FIG. 1 operates in conjunction with an unillustrated conveying means for transporting documents through a sensing station. The sensing station comprises the two sensors or probes (probe 1 and probe 2 described above) whose position is selectively adjustable with respect to the documents traveling in proximity thereto. Either one of the two probes may be activated by appropriate manipulation of the switch 108 of FIG. 3.

Clock 10 generates pulses in accordance with the particular embodiment thereof utilized as discussed above. For an illustrative example hereinafter discussed, the clock 10 functions as a position encoder to produce a pulse for every one-sixth inch displacement a document travels along the path of the conveying means. Thus, the frequency $f_1$ of clock 10 is variable and is dependent upon the rate of travel of the documents traveling on the conveying means. The clock 10 operates in timed synchronization with the feeding of each document by virtue of a detector positioned proximate a feed point of a conveyor drive mechanism.

The indicia-to-be-read can occur at any point along a document (and under a probe) other than a margin of the document which would be read between the first two pulses of the clock 10. Most often a relatively specific location of the mark-to-be-read will be standardized for a particular application. In some embodiments, information corresponding to the standardized location of the indicia may be used to pre-program (by unillustrated circuitry) the probe to enable the same only during specified time intervals. For an illustrative example hereinafer discussed, it will be presumed that the indicia-to-be-read will occur on the traveling document at a distance corresponding to a portion of the document which will be read between the second and third pulses of the clock 10.

The oscillator 46 is preset to generate pulses having a selected frequency $f_2$ and a period $t_2$. The frequency $f_2$ and period $t_2$ of the oscillator 46 are adjustable by controlling appropriate input pins to the HiNil device 114 as seen in FIG. 2. For the particular embodiment shown and for the present example, the oscillator 46 is adapted to generate approximately 100 pulses during each period $t_1$ of the clock 10.

The first pulse of clock 10 causes a brief high signal on leads 12 and 16. Immediately thereafter, leads 12 and 16 go low. The low signal on lead 12 enables NAND 14. Enablement of NAND 14 triggers one-shot 22. The Q output terminal of one-shot 22 is connected by line 42 to the preset enablement pin of the presettable up/down counter 40 so that the resultant high signal on lead 42 causes the contents of the counter 40 to be preset to the value of the N-1 bit signal carried by bus 80. Since the bus 80 applies the N-1 upper order bits of the digital contents of the binary counter 64, the presettable up/down counter 40 is preset to approximately one-half of the contents of the binary counter 64 at the time of preset. After the one-shot 22 has been triggered, its $\overline{Q}$ output terminal returns to high to trigger the one-shot 24.

Triggering of the one-shot 24 essentially accomplishes three things: First, a high signal is applied on lead 26 to trigger the T terminal of the JK flip-flop 28, thereby resetting the flip-flop 28 so that the signal on lead 92 from output terminal Q is low. Second, a high pulse applied on leads 26, 38, and 70 resets the 12-stage binary counter 64. Third, a high pulse at the Q terminal of one-shot 24 applies a high trigger pulse via leads 26, 38, and 36 to the T terminal of the JK flip-flop 34, thereby resetting the flip-flop 34.

As mentioned before, the oscillator 46 generates clock pulses having a frequency $f_2$ during the period $t_1$ of the clock 10. For the particular example being described, 100 such pulses are generated by the oscillator 46 during the period $t_1$ of the clock. The clock pulses generated by oscillator 46 are basically used in two ways. First, the pulses are fed to the twelve-stage binary counter 64. Second, the pulses generated by oscillator 46 are applied via leads 48 and 50 to a clock-receiving input pin of the presettable up/down counter 40.

For purposes of the ensuing discussion, probe 1 connected to the FIG. 3 circuit will be utilized. In this respect, switch 108 is adapted to generate a high signal on lead 110 if probe 1 is selected for use. Since the indicia-to-be-read does not occur between the first and second pulses of clock 10, during this particular time period (hereinafter referred to as an interval) a high signal is maintained on lead 104 (as well as on lead 106). In this respect, lead 104 conducts a high signal so long as an indicia is not being read. As a result of high signals on leads 104, 106, and 110, NAND gate 98 is disabled, NAND 100 is disabled, and NAND 96 is enabled. Since NAND 96 is enabled and NAND 98 is disabled, NAND 102 is enabled, so that a high voltage appears on lead 32. The high signal on lead 32 is maintained throughout the time interval between the first and second pulses of clock 10 since no indicia was encountered during that interval. Thus, the probe switching circuit 30 does not activate the low-activated set terminal $\overline{S}$ of the flip-flop 34.

Because the low-activated set terminal $\overline{S}$ of the flip flop 34 is not activated during the first interval defined by the first and second pulses of clock 10, the $\overline{Q}$ output terminal of flip-flop 34 remains high. Hence, since a high signal applied to the change-of-direction pin of the up/down counter 40 causes the counter 40 to count in the positive direction, the counter never changes direction during the first interval of the first clock 10. Further, the Q output terminal of the flip-flop 34 remains low so that even when the second pulse is generated by clock 10, NAND 18 remains enabled and its output does not go through a transition from a low signal to a high signal as it would had the Q output of the flip-flop 34 gone high. Since no transitions from low to high occur on lead 94 connecting the NAND gate 18 to the utilization circuit 90, no positive-going signal is applied on lead 94 to trigger the T terminals of the JK flip-flops 156 and 160 of the utilization circuit 90. Thus, since the utilization circuit 90 is essentially unaffected during the first interval of the clock 10, the contents of the up/down counter 40 and the comparator 66 are of no consequence.

With the exceptions hereinafter noted, the above steps are essentially repeated upon generation of the second pulse of the clock 10. It should be noted, however, that upon completion of the first interval of the clock 10 a digital value corresponding to approximately one-half of the value of the contents of the binary counter 64 is loaded by bus 80 into the up/down counter 40 to preset the counter 40. For the particular example under discussion, the binary counter 64 counted 100 pulses from the oscillator 46 during the first interval of clock 10 so that, upon a present enablement signal being applied to the counter 40, the counter 40 is preset to a digital value 50. Likewise, it should be noted that the counter 64 is thereafter initialized at zero in the manner described above.

During the second interval of the clock 10, the oscillator 46 continues to generate pulses. It is in this second clock 10 interval, however, that the indicia on a document traveling proximate the read station is sensed. When probe 1 reads the indicia, it can be seen from the circuit of FIG. 3 that a low signal on lead 104 and high signals on leads 106 and 110 result in a low signal on lead 32 as the output of the probe switching circuit 30.

When the probe switching circuit 30 generates a low signal on lead 32, the low-activated set terminal $\overline{S}$ of flip-flop 34 is activated so that the terminal $\overline{Q}$ goes low. A low signal on the output terminal $\overline{Q}$ of flip-flop 34 causes the presettable up/down counter 40 to reverse directions and to thereby count down upon reception of pulses via leads 48 and 50 from the oscillator 46. As the $\overline{Q}$ terminal of the flip-flop 34 goes low, its Q terminal goes high.

While the presettable up/down counter 40 is counting, the comparator 66 is continually making comparison between the digital value contained in up/down counter 40 and the digital value contained in the binary counter 64. In this respect, the eight-lead bus 84 connects the data output terminals of the up/down counter 40 to the "word A" input terminals of the comparator 66. Likewise, the data buffered output terminals of the binary counter 64 are connected by bus 60 and lead 82 to "word B" input terminals of the comparator 66.

The presettable up/down counter 40 is a wrap-around device having a carry-over output terminal which is activated should either a negative count occur or should the maximum contents of the counter 40 be exceeded. For example, had the up/down counter 40 been preset to the digital value 50 and had the counter 40 counted all 100 pulses generated by the oscillator 46 in a downward direction, the carry-over terminals of the counter 40 (connected to lead 44) would be high and the contents of counter 40 would be a digital 206.

With further reference to the carry-over terminal of the up/down counter 40, a low signal at the terminal as applied on lead 44 keeps the low-actuated set terminal $\overline{S}$ of the flip-flop 28 activated so that the output terminal Q thereof is high. However, if the carry-over terminal of the up/down counter 40 is high, then the flip-flop 28 remains unaffected so that its Q output is low.

As mentioned above, the comparator 66 compares the digital value received at a bank of data input terminals representing "word A" with the value received at a second bank of data input terminals representing "word B". If "word A" is greater than "word B", the comparator 66 generates a high signal on lead 88. If, on the other hand, "word B" is greater than "word A", a high signal is generated on lead 86. Thus, considering the facts of the present example wherein at the end of an interval of clock 10 the binary counter 64 contains a digital value corresponding to the decimal value 100, should the decimal equivalent of the digital value of "word A" be either less than zero or greater than 100, then the comparator would find "word A" greater than "word B" and generate a high signal on lead 86. If the decimal equivalent of the digital value of "word A" is less than zero, counter 40 would momentarily generate a low signal on lead 44. Otherwise, the signal on lead 44 is low. If the decimal equivalent of "word A" is found to be between zero and 100, then a high signal is applied to lead 88.

The output signals of the comparator 66 as applied to leads 86 and 88 affect the utilization circuit 90 during the trailing edge of a clock pulse from the clock 10. It is during the trailing edge of pulses from clock 10 that the output of NAND gate 18 has a possibility of making a transition from low to high. In order for this transition to occur, however, an indicia must have been read during the preceding interval of clock 10 so that a high signal is applied to the NAND gate 18 from the Q output terminal of the flip-flop 34. The transition of the output signal of the NAND 18 from low to high enables the JK flip-flops 156 and 160 of the utilization circuit.

In the above regard, if "word A" is less than "word B" (that is, a high signal is applied on lead 88 from the comparator 66), then the J input terminal of the flip-flop 160 goes high, and its K input terminal goes low to set the flip-flop 160. Setting the flip-flop 160 causes the output terminal $\overline{Q}$ to go low and thereby activate a low-activated LED 176. Activation of LED 176 indicates that the indicia was read during an acceptable time during the interval of clock 10 for the probe to be properly positioned with respect to the document bearing the indicia.

In the event "word A" is greater than "word B" (i.e., a high signal is applied on lead 86 from the comparator 66), the probe should be repositioned either more to the left or to the right. The resolution of whether a leftward or rightward readjustment for the probe is in order depends on the condition of the carry-over terminal of the presettable up/down counter 40. If the carry-over condition is not in effect, then the signal on lead 92 remains low as described above. A low signal on lead 92 coupled with a high signal on lead 86 causes NAND 150 to be enabled but NAND 154 to be disabled. Accordingly, the K input terminal of flip-flop 156 is high and its J input terminal is low so that the flip-flop 156 is reset. Resetting the flip-flop 156 results in a high signal on lead 186. Because the $\overline{Q}$ output terminal of flip-flop 160 is high, however, high signals now occur both on leads 186 and 180 so that NAND 182 is disabled. Disablement of NAND 182 results in activation of low-activated LED 188. Activation of LED 188 indicates that the probe should be repositioned in a leftward direction.

Should the carry-over pin of the up/down counter 40 momentarily have a low signal, then lead 92 from flip-flop 28 goes high as described above. With high signals on both lead 86 and 92, NAND 150 is disabled and thereby enables NAND 154. As a result, leads 152 and 158 go low (causing a low at the K terminal of flip-flop 156) and the J input terminal of flip-flop 156 goes high. Thus, flip-flop 156 is set so that output terminal $\overline{Q}$ and lead 186 connected thereto go low. In this manner, low-activated LED 190 is illuminated to indicate that the probe should be moved in a more rightward direction in order for the reading of the indicia to occur at an acceptable time with respect to the interval of the clock 10.

It should be understood from the foregoing that the alignment circuit of FIG. 1 is able to track any change in the rate of travel of documents being read. That is, should the rate of travel of documents with respect to the reading station be changed, the alignment circuit of FIG. 1 is capable of continued function without external intervention. In this respect, presetting the up/down counter 40 at a value which is a function of the number of pulses generated by oscillator 46 during the preceding interval of clock 10 enables the circuit to take into consideration any change in the rate of travel of the documents being read, and thus any change in the frequency of the pulses generated by clock 10.

While the invention has been particularly shown and described with reference to the preferred embodiments thereof, it will be understood by those skilled in the art that various alterations in form and detail may be made therein without departing from the spirit and scope of the invention. For example, rather than generating clock pulses as a function of document displacement, the clock 10 can be activated in a number of ways so that it is in relative synchronization with the documents traveling on the conveying means. In one embodiment a sensing station may employ a separate sensor which detects a leading edge of a traveling document for commencing operation of the clock 10.

The embodiments of the invention in which an exclusive property or privilege is claimed are defined as follows:

1. Apparatus for providing and indication of the relative positioning of sensing means with respect to sensed indicia borne by articles traveling proximate said sensing means, said apparatus comprising:
    first clock means for generating first clock pulses;
    means for determining when said indicia is sensed by said sensing means;
    second clock means for generating second clock pulses at a frequency $f_2$ and a period $t_2$, where frequency $f_2$ is greater than the frequency $f_1$ of said first clock, and where $t_2$ is less than the period $t_1$ of said first clock;
    means for counting the number of second clock pulses generated during the period $t_1$ for generating a first signal in accordance therewith;
    means for determining the number of second clock pulses generated before said indicia is sensed relative to the number of second clock pulses generated after said indicia is sensed, said means being adapted to provide a second signal related to said determination;
    comparison means for comparing said second signal provided by said determining means with said first signal generated by said counting means; and,
    means connected to said comparison means for providing an indication whether the sensing of said indicia occurs at an acceptable time between successive first clock pulses in order for said sensing means to be properly positioned with respect to said articles.

2. The apparatus of claim 1 wherein said means for determining the number of second clock pulses generated before said indicia is sensed relative to the number of second clock pulses generated after said indicia is sensed comprises an up/down counter, said up/down counter having
    an enabling input terminal connected to said first clock means;
    a second input terminal connected to said second clock means for counting said pulses generated thereby;
    a third input terminal connected to means for triggering a pulse when said indicia is sensed for changing the direction of said up/down counter upon the triggering of said pulse; and
    at least one output terminal connected to a first bank of input terminals of said comparison means.

3. The apparatus of claim 2, wherein said up/down counter is a presettable up/down counter, said presettable up/down counter having said enabling input terminal as a preset enabling input terminal, said presettable up/down counter further having N-1 preset input terminals connected to N-1 output terminals of said means for counting the number of second clock pulses generated during the present $t_1$, the N-1 output terminals corresponding to the N-1 upper order bits of a digital value contained in said means for counting; wherein N output terminals of said means for counting said second clock pulses is connected to a second bank of input terminals of said comparison means.

4. The apparatus of claim 3, wherein said presettable up/down counter is a wrap-around counter so that a first digital signal applied to said first bank of input terminals of said comparison means is less than a second digital signal applied to said second bank of input terminals of said comparison means whenever said indicia-triggered pulse occurs at an acceptable time between successive first clock pulses.

5. The apparatus of claim 1, wherein said sensing means comprises a plurality of sensors selectively employable with respect to said apparatus, and wherein said apparatus further comprises switching means for selectively employing one of said sensors.

6. The apparatus of claims 1 or 5, wherein said sensing means comprise an optical sensor for reading bar coded indicia.

7. The apparatus of claim 1, further comprising utilization means connected to said determining means for indicating whether said sensing means is properly positioned with respect to said articles.

8. The apparatus of claim 7, wherein said utilization means includes visible indicating means for providing an indication to an operator of the position of said sensing means relative to the position of the sensed indicia borne by articles traveling proximate said sensing means.

9. The apparatus of claim 1, wherein said first clock means is adapted to generate pulses as a function of the displacement of said articles traveling on a conveying means proximate said sensing means.

10. The apparatus of claim 1, wherein commencement of the generation of pulses by said first clock means is synchronized with the feeding of said articles onto a conveying means upon which said articles travel.

11. A method for providing an indication of the relative positioning of sensing means with respect to sensed indicia borne by articles traveling proximate said sensing means, said method comprising the steps of:
generating first clock pulses at a frequency $f_1$ and having a period $t_1$;
determining when said indicia is sensed by said sensing means;
generating second clock pulses at a frequency $f_2$ and having a period $t_2$;
counting the number of second clock pulses generated during the period $t_1$ and generating a first signal in accordance therewith;
determining the numer of second clock pulses generated before said indicia is sensed relative to the number of second clock pulses generated after said indicia is sensed and providing a second signal related to said determination;
comparing said second signal provided by said determination with said first signal generated by said counting; and,
using said comparison as a basis for determining whether the sensing of said indicia occurs at an acceptable time between successive first clock pulses in order for said sensing means to be properly positioned with respect to said articles.

12. The method of claim 11, wherein said step of determining the number of second clock pulses generated before said indicia is sensed relative to the number of second clock pulses generated after said indicia is sensed comprises the steps of:
counting up on an up/down counter the number of second clock pulses before said indicia is sensed;
triggering a pulse upon the sensing of said indicia;
applying an indicia-triggered pulse to a terminal of said up/down counter which changes the counting direction thereof;
counting down on said up/down counter the number of second clock pulses occurring after the occurrence of said indicia-triggered pulse but before the occurrence of a first clock pulse; and,
providing a signal indicative of the digital value stored in said up/down counter to said comparator upon a subsequent first clock pulse.

13. The method of claim 11, wherein a digital count value is preset in said up/down counter by
applying to N-1 preset data input terminals of said up/down counter a first digital value corresponding to the N-1 upper order bits of a second digital value indicative of the number of second clock pulses generated during period $t_1$; and,
enabling said up/down counter to receive said first digital value upon the generation of a subsequent first clock pulse.

14. The method of claim 11, further comprising the step of
indicating to an operator the position of said sensing means relative to the position of the sensed indicia borne by articles traveling proximate said sensing means.

15. The method of claim 11, wherein the frequency $f_1$, at which said first clock pulses are generated is a function of the placement of said articles traveling on a conveying means proximate said sensing means.

16. The method of claim 11, wherein the generation of said first clock pulses is commenced in synchronization with the feeding of said documents onto a conveying means upon which said articles travel.

17. Apparatus for providing an indication of the relative positioning of sensing means with respect to sensed indicia borne by articles traveling proximate said sensing means, said apparatus comprising:
first clock means for generating first clock pulses;
means for determining when said indicia is sensed by said sensing means;
means for determining whether the sensing of said indicia occurs at an acceptable time between successive first clock pulses in order for said sensing means to be properly positioned with respect to said articles; and,
means for indicating in what manner said sensing means should be repositioned so that said sensing occurs at said acceptable time.

18. A method for providing an indication of the relative positioning of sensing means with respect to sensed indicia borne by articles traveling proximate said sensing means, said method comprising the steps of:
generating first clock pulses at a frequency $f_1$ and having a period $t_1$;
determining when said indicia is sensed by said sensing means;
determining whether the sensing of said indicia ocurs at an acceptable time between successive first clock pulses in order for said sensing means to be properly positioned with respect to said articles; and,
providing an indication regarding the manner in which said sensing means should be repositioned so that said sensing occurs at said acceptable time.

* * * * *

UNITED STATES PATENT AND TRADEMARK OFFICE
CERTIFICATE OF CORRECTION

PATENT NO. : 4,479,050
DATED : October 23, 1984
INVENTOR(S) : David J. Helffrich It is certified that error appears in the above-identified patent and that said Letters Patent is hereby corrected as shown below:

COLUMN 2, Line 63, delete the second occurrence of "the".
COLUMN 8, Line 46, delete the word "low" and insert the word -- high --.

Signed and Sealed this

Sixth Day of August 1985

[SEAL]

Attest:

DONALD J. QUIGG

*Attesting Officer*  *Acting Commissioner of Patents and Trademarks*